Feb. 7, 1961  F. S. FLICK  2,970,871
PISTON ASSEMBLY
Filed Aug. 24, 1959  2 Sheets-Sheet 1
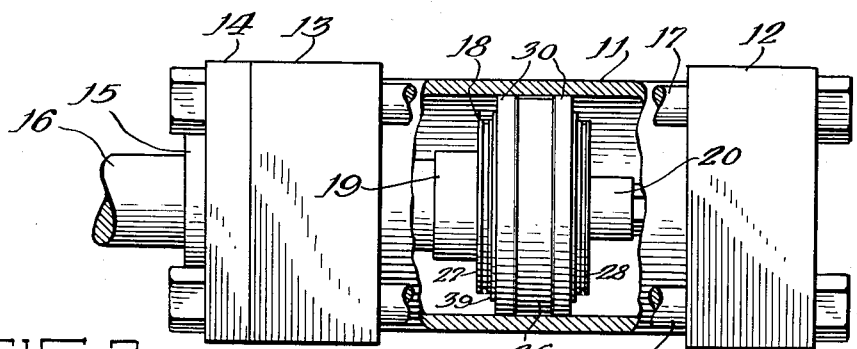
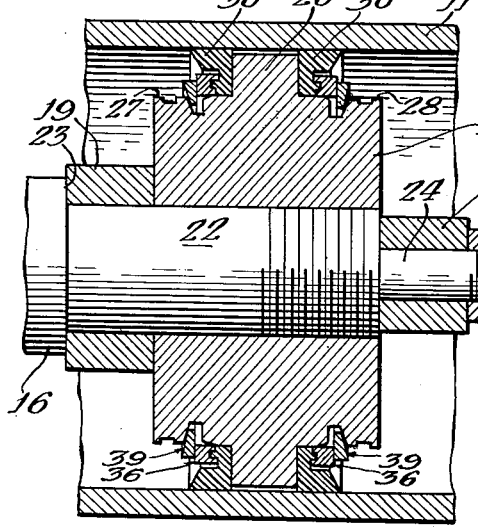
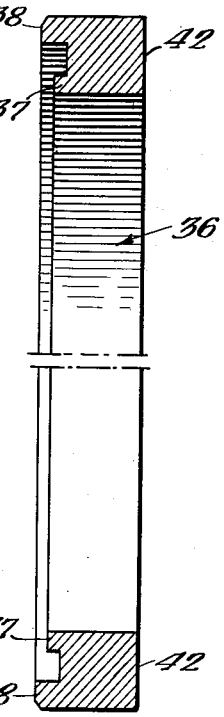
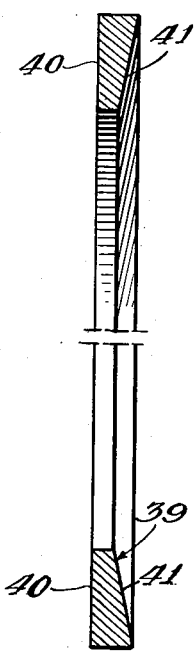
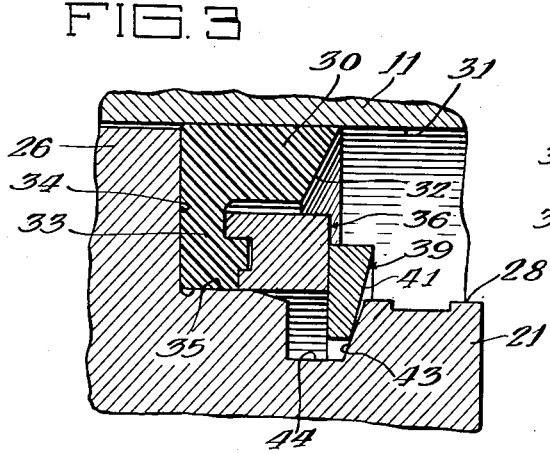
Inventor:
Francis S. Flick
By Hofgren, Brady, Wegner,
Allen & Stellman
Attorneys Feb. 7, 1961    F. S. FLICK    2,970,871
PISTON ASSEMBLY
Filed Aug. 24, 1959    2 Sheets-Sheet 2
FIG.6  FIG.7  FIG.8
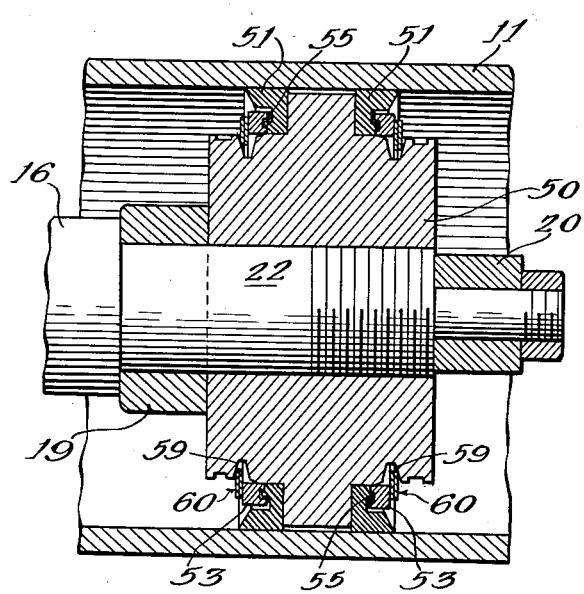
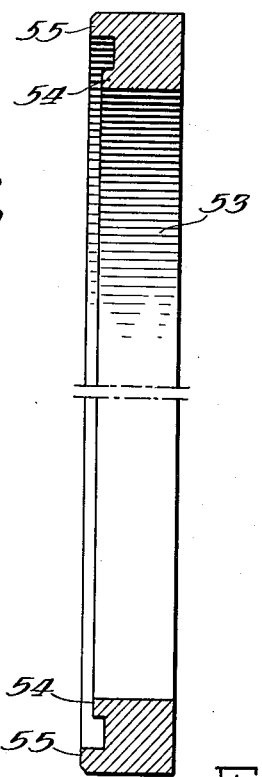
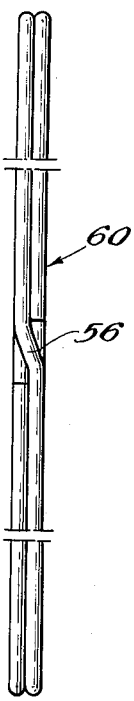
FIG.10
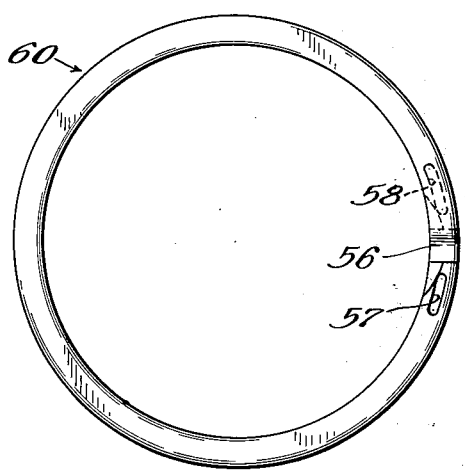
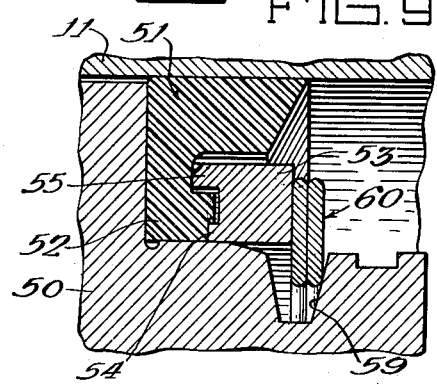
FIG.9
Inventor:
Francis S. Flick
By: Hofgren, Brady, Wegner,
Allen & Stellman
Attorneys United States Patent Office 2,970,871
Patented Feb. 7, 1961

2,970,871
PISTON ASSEMBLY

Francis S. Flick, Oak Park, Ill., assignor to Flick-Reedy Corporation, a corporation of Illinois Filed Aug. 24, 1959, Ser. No. 835,778

9 Claims. (Cl. 309—4)

This invention relates to fluid piston and cylinder devices and more particularly to a piston and seal assembly for use in such devices.

Piston assemblies which have used cup seals have generally been made in one of two ways. One of these has utilized a plain follower piston with a follower on either side, one of the followers being either threaded directly on the piston rod or held in place by a threaded nut. The piston and the followers are mounted directly on the rod and provide annular spaces or grooves for receiving and clamping on the base of oppositely facing cup seals. The full strength of the piston rod is only developed by tightening the piston assembly thereto with a sufficient torque to develop a required pre-stress in the rod. The torques required to develop this pre-stress, particularly in larger sizes of pistons, can be done in the factory at original assembly but is often difficult to develop in the field. In order to change the cup seals on the piston, the piston assembly has to be disassembled from the rod and this has caused a difficulty in reassembling the parts to develop the proper pre-stress in the piston rod.

The other form of piston construction which has been used with cup seals employs a one-piece piston with a bolted-on follower ring to clamp the base of the cup seal to the piston. In such structures, there has been difficulty in obtaining an even tightening of the clamping ring against the seal base unless the ring was tightened against the metal of the piston. In instances where the ring was tightened only against the cup seal base, there was difficulty in obtaining a sufficient initial tightening to prevent loosening of the cup seal after high hydraulic pressures were applied to the cup seal base during operation. In addition to the above difficulties, the one-piece pistons generally require more space for the bolted-on clamping rings and were higher in cost due to additional machining and assembling operations required.

Both of the piston assemblies described above presented a problem of clamping the base of the cup seal securely to the piston upon initial assembly, while avoiding too much squeeze which might cause the base of the seal to extend outwardly so much that the heel of the cup might engage the cylinder, causing excessive drag or friction. It was, therefore, desirable that in both forms, the clamping ring or follower be seated against the metal of the piston thereby limiting the amount of squeeze on the base of the cup seal. This also presented difficulty because of the necessary manufacturing tolerances in the metal parts and cup seals. When provision was made, such that the seals would be held securely when the manufacturing tolerances were at one extreme, a situation was created in which the base of the cup seals was excessively squeezed when parts were assembled, all of which had a manufacturing tolerance at the opposite extreme.

The present invention solves the difficulties enumerated generally by providing the single thickness piston with follower rings held in place with tapered wedging spring-urged action. The follower rings and the urging structure provides a proper squeeze on the base of the cup seals at initial assembly and further has the ability to tighten itself against the base of the seal should high hydraulic pressure during operation further squeeze the seal. In addition, the action is self-locking so that reverse pressures or friction on the seal cannot loosen the clamping action.

The primary object of this invention is to provide a new and improved piston and seal assembly for use in piston and cylinder devices.

Another object is to provide a piston assembly of the character described wherein the base of a cup seal will be properly clamped to the piston at initial assembly even though the seal and component metal parts may vary within manfacturing tolerances.

Another object is to provide a piston assembly of the character described in which the seal clamping structure will adjust itself to clamp with the sufficient force even though the thickness of the cup seal base be lessened by action of hydraulic pressure thereon during operation.

Another object is to provide a structure for clamping a cup seal to a piston which does not depend upon the skill of a person making the assembly in order to properly clamp the seal to the piston.

Another object is to provide a cup seal clamping structure for a piston assembly which is self-adjusting and self-regulating to maintain a relatively constant pressure on the base of the cup seal.

A further object is to provide a piston and seal assembly of the character described in which the seals may be readily removed and replaced without removing the piston from its piston rod.

Other objects, features and advantages of the present invention will become apparent from the following description of preferred embodiments of the invention illustrated in the accompanying drawings, in which:

Figure 1 is a side elevational view of a piston and cylinder device partially broken away to illustrate the structure thereof and having a piston assembly of this invention therein;

Figure 2 is an enlarged fragmentary sectional view through a piston and cylinder device and piston assembly of this invention showing one form of the piston and seal assembly;

Figure 3 is a still larger fragmentary sectional view of one of the seal rings and adjacent piston body shown in Figure 2;

Figure 4 is an enlarged fragmentary broken and sectional view of the follower ring shown in the piston assembly of Figure 2;

Figure 5 is a fragmentary enlarged sectional view through the split ring member of the sealing ring retaining device as shown in Figure 2;

Figure 6 is a view similar to Figure 2 of an alternate and preferred form of the piston assembly of this invention;

Figure 7 is a sectional fragmentary view through the follower ring shown in Figure 6;

Figure 8 is a fragmentary broken end view of the split ring utilized in the assembly of Figure 6;

Figure 9 is a still larger fragmentary sectional view through one of the sealing rings used on the piston assembly of Figure 6, and Figure 10 is a plan view of the split ring shown in Figure 8.

The piston and cylinder devices with which the piston assembly of this invention might be used is generally illustrated in Figure 1. The cylinder barrel 11 has a cap 12 at one end, a head 13 at the opposite end with a retaining plate 14 thereagainst for retaining a bushing 15 for the piston rod 16 therein. The assemblage of the head, cap and cylinder barrel are retained in place by tie rods 17 with appropriate tie rod nuts on the outer sides of the head and cap. The piston rod 16 at its inner extent mounts a piston assembly generally indicated 18. The ports for admitting the hydraulic fluid into the cylinder are generally connected into the head and cap and enter the cylinder concentrically with the piston rod. The enlarged cushions 19 and 20 on either side of the piston assembly may enter the ports and cushion the movement of the piston at either end of its stroke.

The piston assembly disclosed may be used in cylinder devices used in extremely high pressure applications. The rated working pressures to which the cylinders are normally subjected may range from 500 to 3000 pounds per square inch, and the cylinders may be subjected to shock loads at higher pressures.

The particular form of the piston illustrated in Figure 1 is more clearly illustrated in Figures 2 through 5. The piston body 21 is threadably mounted directly upon a portion 22 of the piston rod 16. The inner bore through the one-piece piston body 21 is of a size to have a close fit with the portion 22 of the piston rod and the cushion sleeve 19 may also be mounted on this portion abutting a shoulder 23 on the piston rod so that the piston body abuts the cushion member 19. The piston body is threaded upon the threads illustrated on the portion 22 of the piston rod so that the threads hold the piston assembly against the cushion sleeve 19. The outer cushion portion 20 is mounted on a reduced sized portion 24 of the piston rod and held in place by an appropriate nut 25.

The piston is so formed that it has a centrally disposed and outwardly extending annular portion 26 and a circular cylindrical portion at either side thereof. The circular cylindrical surface 27 or 28 adjoins the radially extending walls of the central portion to form a substantial right angle between the two surfaces. In this area is formed the seat for the sealing ring.

The preferred form of the sealing ring is best shown in Figure 3. The ring may be made of acceptable seal materials, such as leather, rubber, synthetic rubber, Teflon (Teflon being the trademark belonging to Du Pont for tetrafluoroethylene plastic) or others and embodies a sealing lip 30 intended to have contact with the inner wall 31 of the cylinder 11. The inner wall of the cylinder is generally honed to a relatively fine finish so as to be smooth and free of any rough areas. The sealing ring will slide in contact with the wall and is provided with a beveled surface 32 against which pressure will act to insure that the sealing ring engages the wall. A slight clearance is provided between the central portion 26 of the piston and cylinder wall 31. The base 33 of the sealing ring engages the outwardly extending wall 34 of the central portion of the piston and the circular cylindrical wall 35 of the circular cylindrical portion of the piston. The engagement is intended to be with a static sealing pressure. The sealing rings are formed so that the inner diameter of the ring is slightly smaller than the diameter of the circular cylindrical portion 35 so that the act of assembling of the sealing ring longitudinally over the circular cylindrical portion of the piston will place a slight amount of pre-stress on the inner diameter of the ring.

Means are provided to hold the seal ring in its seat. A follower ring 36 contacts the base of the seal. The initial movement of the follower ring 36 toward its assembled position will cause the rib 37 thereon to engage the seal ring and sufficient pressure is applied to the follower ring so that both rings 37 and 38 will engage the seal material. The amount of movement or compression of the base of the seal ring may be from about five thousandths to ten thousandths of an inch maximum upon initial compression of the base of a seal ring. The pressure is applied to the follower ring by a split ring member 39 more clearly illustrated in Figure 5. The split ring has a radially extending side 40 and an opposite side 41 arranged at an angle thereto. The outer end 42 of the follower ring is radial so that the two surfaces 40 and 42 may engage, as illustrated in Figure 3, when the split ring 39 is placed against the outer sloping wall 43 of a groove 44 formed in the piston itself. The split ring is under its spring urge to decrease its circumference and move inwardly radially of the piston. Thus, any movement that occurs will cause a camming action between the surfaces 41 and 43, tending to move the follower ring 36 toward the base of the seal ring.

The assembly illustrated in Figures 2 through 5 and described above will cause a proper sealing contact of the base of the sealing ring 30 on the piston itself. The proper compression is always applied to the base of the sealing ring and should high hydraulic pressures squeeze the base of the sealing ring, the assemblage of the rings urging the base material into sealing position will automatically follow, maintaining the sealing ring tight on the piston.

The preferred form for the piston assembly and its seal rings is shown in Figures 6 through 10. The piston 50 is substantially the same as the piston shown in Figures 2 and 3, the form of the groove holding the means for urging the sealing ring into position being slightly different. The piston rod 16 is substantially the same as are the cushion plungers 19 and 20 and the manner in which the piston 50 is mounted upon the piston rod portion 22. Referring particularly to Figure 9, the form of the sealing ring 51 is identical with the sealing ring 30 shown in Figure 3. This sealing ring may be assembled on the piston without distention. The circular cylindrical portion of the piston is of such size as to allow the sealing ring to be slipped over the end of the piston, placing only a small amount of pre-stress on the inner leg 52 of the sealing ring.

The form of the means urging the sealing ring into its seat on the piston is generally the same as shown in Figures 2 and 3, but varies in its specific details. The follower ring 53 is shown in detail in Figure 7. It embodies a continuous metal ring having a pair of lips 54 and 55, which extend toward the sealing ring and the outer lip extends further than the inner lip. The inner lip will engage the base of the sealing ring prior to the outer lip by about 5 to 10 thousandths inches. Initially, the sealing ring base is compressed sufficient that both lips 54 and 55 contact the ring.

The means for urging the sealing ring into its seat comprises a split ring 60 particularly illustrated in Figures 8 and 10. The ring comprises at least one and a half, but preferably two, coils of a spring steel member coiled upon itself with an offset portion 56 in the center of the ring so that the ring, even though comprising two turns, provides flat opposed sides. The ends of the ring material may be provided with gripping holes 57 and 58, as illustrated in Figure 10, so that an appropriate tool may expand the ring, allowing its placement over the end of the piston assembly although the ring may be and is ordinarily applied to the piston by hand without the aid of tools.

The groove for receiving the split ring 60 is best shown in Figure 9. The outer wall 59 is sloped at about a 12° angle to the radius of the piston and the ring engages this wall intermediate its outer and inner extent. The ring is distented outwardly as applied to the piston and thus tends to change its circumference to a smaller size and move downwardly along the wall 59 of the groove inwardly of the piston and in so doing, moves longitudinally of the piston body, pushing the follower ring 53 tightly against the base of the seal ring. During actual operation, any movement which occurs due to temperature changes will be compensated by movement of the ring.

The angle of 12° of the wall 59 has been found quite serviceable and appropriate to operating under high temperature and pressure variations.

By utilizing the one-piece piston of the present invention, any problem of leakage past the piston and the seal is practically eliminated since no differential in the pressure is applied to the sealing ring on the piston tending to dislodge it from the seated position. Removal and replacement of the cup seals may be easily accomplished without removing the piston from the piston rod. Each of the sealing rings may be applied quite easily over the end of the circular cylindrical portions of the piston and placed in proper position. The mere application of the follower ring and the split ring means for urging the sealing ring to its seated position may also be easily applied or removed from the piston assembly. It has been found that the entire section of the sealing ring may be reduced in the present application over such cup seals heretofore used. The means for holding the sealing ring in place does not particularly require a large section and the sealing lip engaging the cylinder wall may be relatively smaller than heretofore thought possible.

The foregoing detailed description has been given for clearness of understanding only, and no unnecessary limitations should be understood therefrom for some modifications will be obvious to those skilled in the art.

I claim:

1. A piston for a piston and cylinder device, comprising: a piston body having a circular cylindrical portion and an enlarged central outwardly extending section forming therewith a pair of oppositely facing seats for sealing rings, a sealing ring positioned in each seat, said ring having an outer pressure sensitive lip for sealing contact with the wall of a cylinder in which said piston may be placed and a base in static sealing contact with said piston body, means yieldingly urging the base of said sealing ring longitudinally of said piston body into said sealing contact with said body including a ring follower member engaging said sealing ring base and means engaging said piston body and ring follower member and resiliently yieldingly urging said ring follower member toward said sealing ring.

2. A piston as specified in claim 1 in which a split ring of spring steel engages said ring follower member and a groove in said piston body and means are provided for translating movement of said split ring inwardly of said piston into longitudinal movement of said follower ring toward said sealing ring.

3. A piston as specified in claim 2 in which said piston body has a groove spaced outwardly from said seat for said sealing ring, a sloping wall forms the outer side of said groove and said split ring engages said sloping wall intermediate its inner and outer extent.

4. A piston for use in a piston and cylinder device, comprising: a generally circular cylindrical piston body having a central outwardly extending annulus of lesser length than the piston body and forming therewith a seat for a sealing ring on either side of said central annulus, a sealing ring seated in each seat and having an outer sealing lip extending longitudinally of said piston and a base in static sealing contact with said piston body, said piston body having a pair of grooves therein each extending annularly thereabout in spaced relation to said adjacent seat for said sealing ring, means constantly urging the sealing ring to seated position on the piston including a follower ring engaging the base portion of said sealing ring, a spring ring mounted in said groove and cooperating engaging wedge surfaces between members of said urging means for cooperatively automatically urging said follower ring toward said sealing ring upon inward movement of the spring ring relative to the piston body.

5. A piston for use in piston and cylinder devices, comprising: a piston body having a central opening for receiving a piston rod, and a circular cylindrical portion at opposite ends of the piston body, the inner extent of each circular cylindrical portion of said piston body forming one side of a seat for a sealing ring permitting the placement of a sealing ring in said seat over the end of the piston body without substantial distention of said sealing ring, a cup sealing ring seated in each said seat, said piston body having an annular groove therein spaced from said seat for said sealing ring, an annular metal follower ring for engaging said sealing ring and spring means engaging in said piston groove and urging said follower ring longitudinally to hold said sealing ring in place and automatically self-adjustable to exert generally constant pressure toward said sealing ring.

6. A piston for use in a piston and cylinder device, comprising: a one-piece piston body having a central opening for receiving a piston rod therein, said piston body having a central outwardly extending annular portion with a circular cylindrical portion extending longitudinally from each side of said central portion, said annular and circular cylindrical portions of said piston body forming a substantially right angled groove for receiving a sealing ring seated therein, said circular cylindrical portion permitting movement of a sealing ring longitudinally thereover without substantial distention thereof, a sealing ring seated in each of said seats and including an outer lip extending longitudinally of said piston for engaging the wall of the cylinder and a base portion seated in static sealing contact with said piston body, means urging said sealing ring into seated position including an annular follower ring engaging the base of said sealing ring, means continuously urging said follower ring toward said sealing ring base including a split ring in contact with said follower ring, said piston body having an annular groove receiving a portion of said split ring, movement of said split ring inwardly of said piston being translated into longitudinal movement of said follower ring toward said sealing ring base.

7. A piston for use in piston and cylinder devices, comprising: a piston body having a central opening for receiving a piston rod, and a circular cylindrical portion at opposite ends of the piston body, the inner extent of each circular cylindrical portion of said piston body forming one side of a seat for a sealing ring permitting the placement of a sealing ring in said seat over the end of the piston body without substantial distension of said sealing ring, a cup sealing ring seated in each of said seat, said piston body having an annular groove therein spaced from said seat for said sealing ring, said groove having a radially directed and extending side wall, an annular metal follower ring for engaging said sealing ring and spring means engaging in said piston body groove and urging said follower ring longitudinally to hold said sealing ring in place, said spring means including a split ring engaging said side wall of said groove and cooperating wedge surfaces between said follower ring and split ring extending at an angle to said side wall of the groove whereby movement of the split ring radially inwardly causes longitudinal movement of said follower ring toward the base of said sealing ring.

8. A piston for use in piston and cylinder devices, comprising: a piston body having a central opening for receiving a piston rod, and a circular cylindrical portion at opposite ends of the piston body, the inner extent of each circular cylindrical portion of said piston body forming one side of a seat for a sealing ring permitting the placement of a sealing ring in said seat over the end of the piston body without substantial distension of said sealing ring, a cup-sealing ring seated in each said seat, said piston body having an annular groove therein spaced from said seat or said sealing ring, said groove having an outer wall arranged at an acute angle to the radius of the piston body, a split ring engaging said outer wall intermediate its inner and outer extent, said split ring abutting the outer extent of said follower ring whereby movement of the split ring inwardly of the piston causes longitudinal movement thereof and of said follower ring toward the base of said sealing ring.

9. A piston for use in a piston and cylinder device, comprising: a one-piece piston body having a central opening for receiving a piston rod therein, said piston body having a central outwardly extending annular portion with a circular cylindrical portion extending longitudinally from each side of said central portion, said annular and circular cylindrical portions of said piston body forming a substantially right-angled groove for receiving a sealing ring seated therein, said circular cylindrical portion permitting movement of a sealing ring longitudinally thereover without substantial distension thereof, a sealing ring seated in each of said seats and including an outer lip extending longitudinally or said piston for engaging a wall of the cylinder and a base portion seated in static sealing contact with said piston body, means urging said sealing ring into seated position including an annular follower ring engaging the base of said sealing ring, means urging said follower ring toward said sealing ring base including a split ring in contact with said follower ring, said split ring comprising more than one turn of flat spring metal stock, said piston body having an annular groove receiving a portion of said split ring, said ring resting against a sloping side wall of said groove angled relative to the radius of said piston body whereby to move said ring longitudinally of said piston body upon inward movement of the ring in said groove, movement of said split ring inwardly of said piston being translated into longitudinal movement of said follower ring toward said sealing ring base, said split ring engaging said follower ring to hold the base of said sealing ring in static sealed contact with said piston body.

References Cited in the file of this patent

UNITED STATES PATENTS 2,677,581     Taylor _____ May 4, 1954